United States Patent
Okuda et al.

(10) Patent No.: US 7,178,388 B2
(45) Date of Patent: Feb. 20, 2007

(54) INTAKE AIR FLOW DETECTING DEVICE FOR INTERNAL COMBUSTION ENGINE

(75) Inventors: Yasuo Okuda, Chita (JP); Masakazu Yamada, Nagoya (JP); Satoshi Furukawa, Kariya (JP); Minoru Kondo, Kariya (JP); Noboru Kitahara, Kariya (JP); Shigeru Kamio, Nagoya (JP); Harufumi Muto, Nishikamo-gun (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/151,642

(22) Filed: Jun. 14, 2005

(65) Prior Publication Data

US 2006/0016254 A1 Jan. 26, 2006

(30) Foreign Application Priority Data

Jun. 15, 2004 (JP) .............................. 2004-176763

(51) Int. Cl.
*G01M 15/00* (2006.01)
(52) U.S. Cl. .................................... 73/118.2
(58) Field of Classification Search ................. 73/116, 73/117.2, 117.3, 118.1, 118.2, 202, 202.5, 73/204.11
See application file for complete search history.

(56) References Cited

U.S. PATENT DOCUMENTS

| 6,220,090 | B1* | 4/2001 | Kohno et al. .................. 73/202 |
| 6,223,594 | B1* | 5/2001 | Takiguchi et al. ........ 73/204.21 |
| 6,644,104 | B2* | 11/2003 | Muto et al. ................. 73/118.2 |
| 7,069,139 | B2* | 6/2006 | Muto et al. .................. 701/104 |
| 2001/0049970 | A1* | 12/2001 | Kitahara et al. ......... 73/861.52 |
| 2002/0035868 | A1* | 3/2002 | Muto et al. .............. 73/204.27 |

FOREIGN PATENT DOCUMENTS

JP 2000-320391 11/2000

* cited by examiner

*Primary Examiner*—Eric S. McCall
(74) *Attorney, Agent, or Firm*—Nixon & Vanderhye P.C.

(57) ABSTRACT

An intake air flow detecting device is provided to an intake air passage, through which intake air flows into an internal combustion engine. Intake air flow is divided into a main passage and a bypass passage. The detecting device includes a thermal air flowmeter, a bypass flow delay information calculating means, and a response delay compensating means. The thermal air flowmeter includes a detector arranged in the bypass passage for detecting an air flow amount in the intake air passage. The bypass flow delay information calculating means calculates a bypass flow delay information representing delay in variation in a flow amount in the bypass passage with respect to variation in a flow amount in the main passage. The response delay compensating means compensates delay in response of the air flowmeter in accordance with the bypass flow delay information.

21 Claims, 9 Drawing Sheets

INTAKE AIR FLOW DETECTING DEVICE FOR INTERNAL COMBUSTION ENGINE

CROSS REFERENCE TO RELATED APPLICATIONS

This application is based on and incorporates herein by reference Japanese Patent Application No. 2004-176763 filed on Jun. 15, 2004.

FIELD OF THE INVENTION

The present invention relates to an intake air flow detecting device for an internal combustion engine that has an intake air passage, through which intake air flows, the intake air passage having a main passage and a bypass passage, into which intake air flow is divided, the detecting device including a thermal air flow meter that detects an amount of air flowing through the intake air passage using a detector arranged in the bypass passage.

BACKGROUND OF THE INVENTION

In general, a bypass-type thermal flow meter includes a hot wire, i.e., a heater and a temperature sensor that are arranged in a bypass passage provided to an air intake passage of an internal combustion engine. Electricity is supplied to the hot wire, and is controlled such that a temperature difference between temperature of the hot wire and temperature detected using the temperature sensor (intake air temperature) is maintained to be constant. Thereby, the bypass-type thermal flow meter detects the amount of intake air flow in accordance with electricity supplied to the hot wire, i.e., an amount of heat radiated from the hot wire.

The thermal flow meter includes a bobbin, around which the hot wire is wound, and a support, which supports the bobbin. Heat is radiated from the hot wire to intake air, and the heat radiation delays through the bobbin, the support, and the like. Accordingly, a detection signal of the amount of intake air, which is output from the thermal flowmeter, delays in response due to delay (radiation delay) in heat radiation.

According to U.S. Pat. No. 6,644,104 (JP-A-2002-97994), the amount of intake air flow of the engine is calculated in accordance with an opening degree of a throttle valve or the like. The amount of intake air flow is compensated in accordance with the radiation delay arising delay in response (response delay) of the thermal flow meter. Thereby, the flow amount of intake air is compensated using the response delay of the thermal flow meter.

In the above bypass-type thermal flowmeter, variation in the flow amount of air, which flows through the bypass passage, delays with respect to variation in the flow amount of air, which flows through the main passage. Accordingly, the response delay arises in the air flowmeter due to the delay in the flow amount (bypass flow amount) of air flowing through the bypass passage. However, only the response delay of the air flowmeter due to the radiation delay is considered in U.S. Pat. No. 6,644,104, and the response delay of the air flowmeter due to the delay (bypass delay) in the bypass flow amount is not considered in U.S. Pat. No. 6,644,104. For example, when intake air flow is in a transient condition, and when the flow amount of intake air is small, influence of the response delay of the air flowmeter due to the bypass delay becomes relatively large with respect to the flow amount of intake air. Accordingly, in this situation, the response delay of the air flowmeter cannot be accurately compensated. As a result, accuracy in detection of the amount of intake air decreases.

SUMMARY OF THE INVENTION

In view of the foregoing problems, it is an object of the present invention to provide an intake air flow detecting device for an internal combustion engine, the detecting device including a bypass-type thermal air flowmeter, in which delay in response in bypass flow can be compensated, so that accuracy in detection of the amount of intake air can be enhanced.

According to the present invention, an intake air flow detecting device for an internal combustion engine is provided to an intake air passage, through which intake air flows into the internal combustion engine. Intake air, which flows through the intake air passage, is divided into intake air flowing through a main passage and intake air flowing through a bypass passage. The detecting device includes a thermal type air flowmeter, a bypass flow delay information calculating means, and a response delay compensating means.

The thermal type air flowmeter includes a detector arranged in the bypass passage. The detector detects an air flow amount in the intake air passage. The bypass flow delay information calculating means calculates a bypass flow delay information. The bypass flow delay information is an information of delay in variation in a bypass flow amount with respect to variation in a main flow amount. The bypass flow amount is an air flow amount in the bypass passage. The main flow amount is an air flow amount in the main passage. The response delay compensating means compensates delay in response of the air flowmeter in accordance with the bypass flow delay information.

The bypass flow delay information calculating means calculates an air flow amount, which has delay in the variation in the bypass flow amount with respect to the variation in the main flow amount. The air flow amount calculated using the bypass flow delay information is the bypass flow delay information.

The detecting device further includes a first means, a second means, and a bypass flow delay information calculating means. The first means calculates air flow velocity in the main passage in accordance with the main flow amount. The air flow velocity calculated using the first means is a main flow velocity. The second means calculates air flow velocity in the bypass passage in accordance with the main flow velocity, a loss factor of the main passage and a loss factor of the bypass passage. The air flow velocity calculated using the second means is a bypass flow velocity. The bypass flow delay information calculating means calculates the bypass flow delay information in accordance with the bypass flow velocity. The bypass flow delay information calculating means compensates the main flow velocity in accordance with at least one of a cross sectional area of the main passage and air density.

The bypass flow delay information calculating means changes at least one of the loss factor of the main passage and the loss factor of the bypass passage. The loss factor of the main passage is changed in accordance with at least one of the main flow velocity and variation in the main flow velocity. The loss factor of the bypass passage is changed in accordance with at least one of the bypass flow velocity and variation in the bypass flow velocity.

The detecting device further includes a heat radiation delay information calculating means that calculates a heat radiation delay information. The heat radiation delay information is an information of delay in heat radiation of the detector of the air flowmeter. The response delay compensating means compensates delay in response of the air flowmeter in accordance with at least one of the bypass flow delay information and the heat radiation delay information.

The response delay compensating means compensates delay in response of the air flowmeter in accordance with both the bypass flow delay information and the heat radiation delay information, only when both following two conditions are satisfied. First, the main flow amount is in a transient region. Second, the main flow amount is in at least one of the following two conditions, in which the main flow amount is in a low flow amount region and the main flow amount is large in variation.

The response delay compensating means compensates delay in response of the air flowmeter in accordance with the heat radiation delay information when at least one the following two conditions is satisfied. First, the main flow amount is out of the transient region. Second, the main flow amount is out of both following two conditions, in which the main flow amount is in the low flow amount region and the main flow amount is large in variation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (Embodiment)

Figure 1:
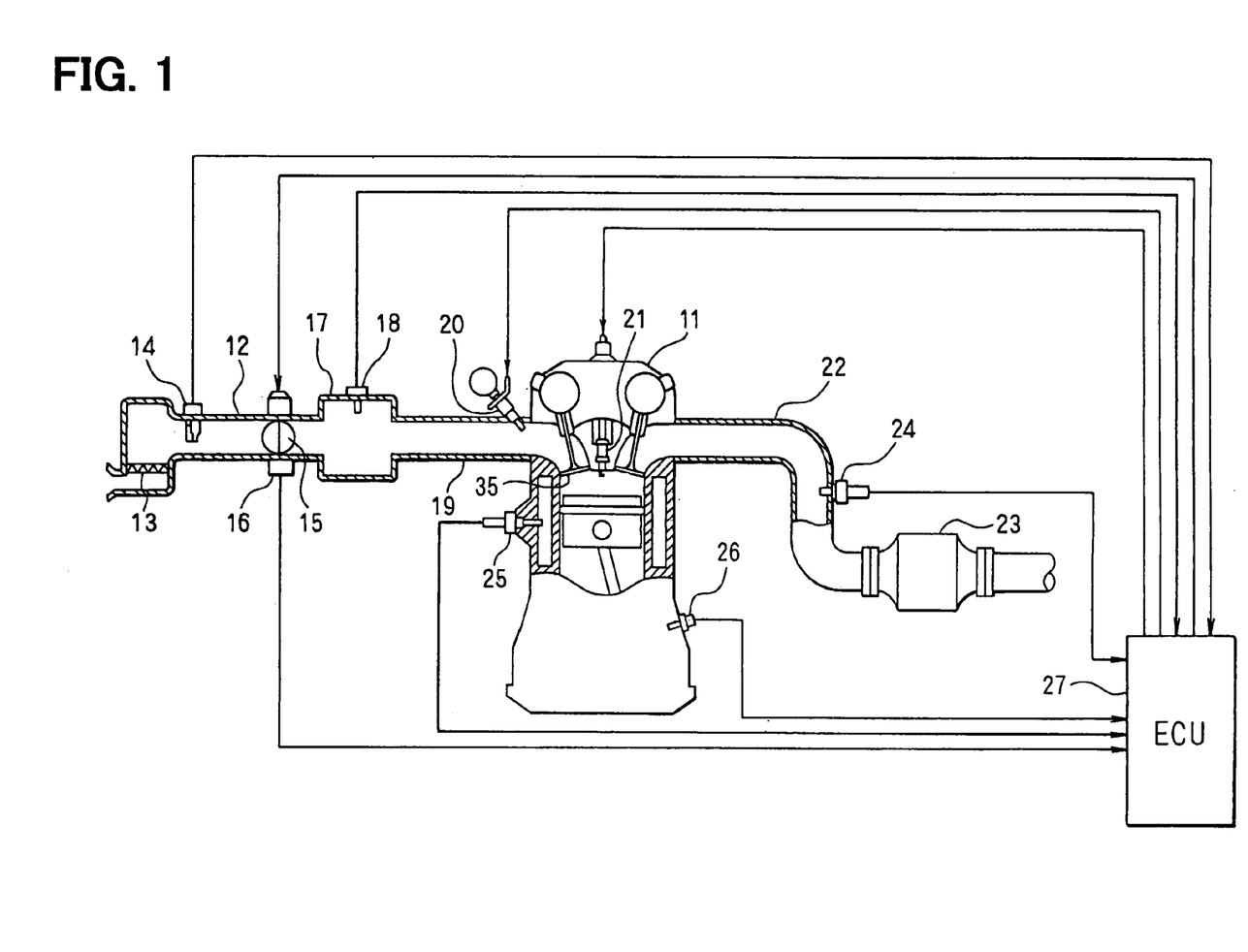
FIG. 1 is a schematic view showing an engine control system according to an embodiment of the present invention.

As shown in FIG. 1, an internal combustion engine 11 includes an air intake pipe (intake passage) 12. An air cleaner 13 is provided to the most upstream in the intake passage 12. A thermal-type air flow meter 14 is provided to the downstream of the air cleaner 13 for detecting an amount of air flowing through the intake passage 12. A throttle valve 15 and a throttle opening sensor 16 are provided to the downstream of the air flow meter 14. The throttle valve 15 is controlled in opening degree using a DC motor or the like. The throttle opening sensor 16 detects opening degree of the throttle valve 15.

A surge tank 17 is provided to the downstream of the throttle valve 15. An intake pipe pressure sensor 18 is arranged in the serge tank 17 for detecting pressure in the intake passage 12. The surge tank 17 is provided with an intake manifold 19, through which intake air is introduced into each cylinder of the engine 11. A fuel injection valve 20 is mounted in the vicinity of an intake port of the intake manifold 19 for each cylinder. An ignition plug 21 is mounted to each cylinder head of the cylinder in the engine 11. The ignition plug 21 sparks, so that mixture gas in the cylinder is ignited.

A catalyst such as a three-way catalyst 23 is arranged in an exhaust pipe 22 of the engine 11 for purifying CO, HC, NOx and the like contained in exhaust gas. An exhaust gas sensor 24 is provided to the upstream of the catalyst 23 for detecting conditions of exhaust gas such as an air fuel ratio thereof, and rich and lean conditions thereof. The exhaust gas sensor is an air fuel ratio sensor, an oxygen sensor 24, and the like.

A cooling water temperature sensor 25 and a crank angle sensor 26 are mounted to the cylinder block of the engine 11. The cooling water temperature sensor 25 detects cooling water temperature. The crank angle sensor 26 transmits a pulse signal when a crankshaft of the engine 11 rotates for a predetermined crank angle. Crank angle and an engine rotation speed are measured in accordance with the signal transmitted by the crank angle sensor 26.

The signals transmitted from the above sensors are input to an ECU (engine control unit) 27. The ECU 27 is mainly constructed of a microcomputer. The ECU 27 executes various engine control programs, which are stored in the ROM (storage medium), so that the ECU 27 controls a fuel injection amount of the fuel injection valve 20 and an ignition timing of the ignition plug 21 in accordance with an operating condition of the engine 11.

Figure 2:
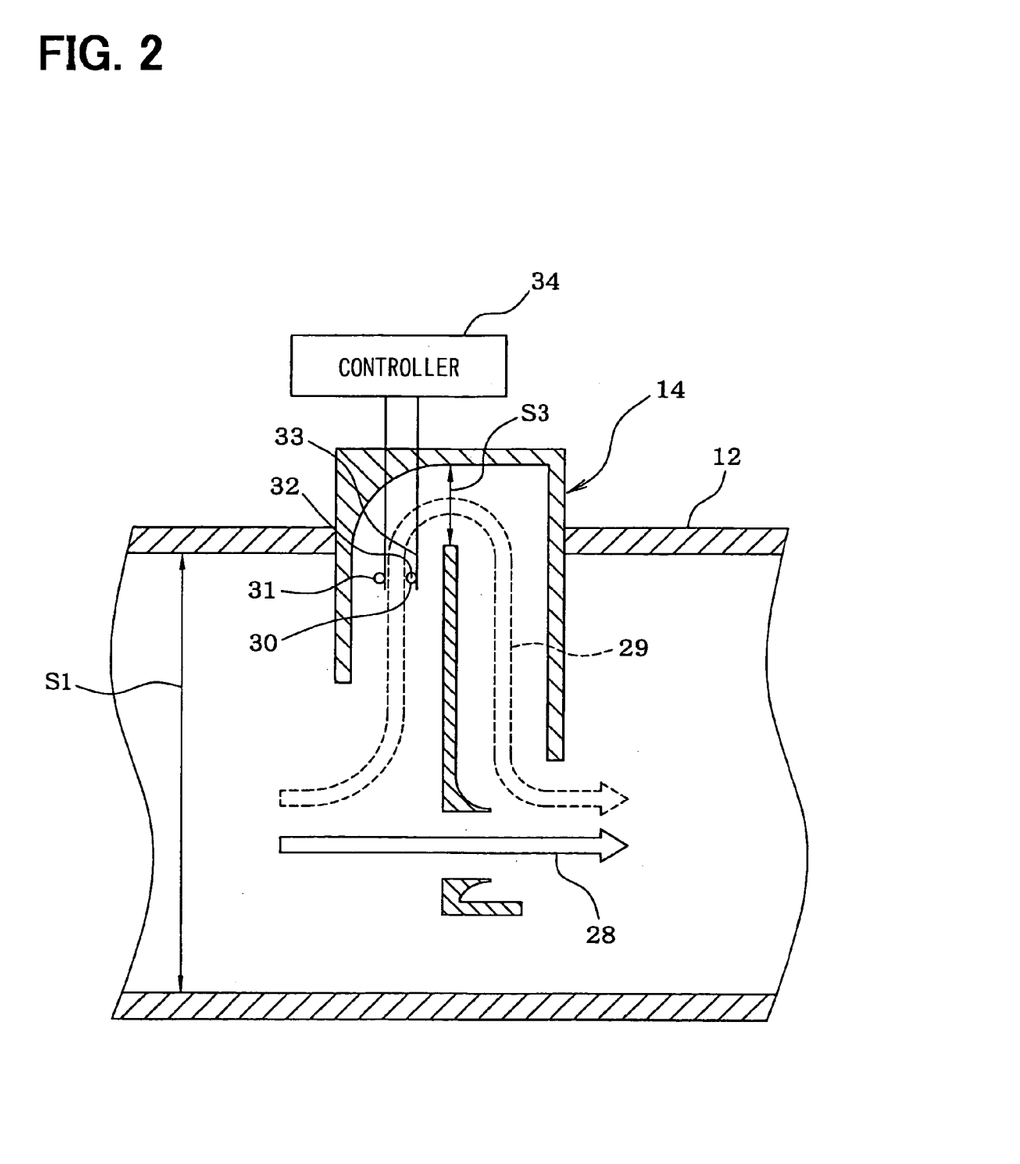
FIG. 2 is a cross sectional side view showing a bypass-type thermal flowmeter according to the embodiment.

As shown in FIG. 2, the thermal-type air flow meter 14 is a bypass-type thermal air flow meter. Intake air flowing through the intake passage 12 is divided into flow in a main passage 28 and flow in a bypass passage 29. A hot wire 30, which is formed of platinum or the like, and a temperature sensor (detector) 31 are arranged in the bypass passage 29. The hot wire 30 is wound around a bobbin 32, which is supported by a support 33. The thermal-type air flow meter 14 controls electricity supplied to the hot wire 30 using an electricity control circuit 34 such that a difference between temperature of the hot wire 30 and temperature (intake temperature) detected by the temperature sensor 31 is maintained to be constant. Thereby, the amount of intake air is measured based on an amount of electricity supplied to the hot wire 30, i.e., based on an amount of heat radiated from the hot wire 30.

Figure 3:
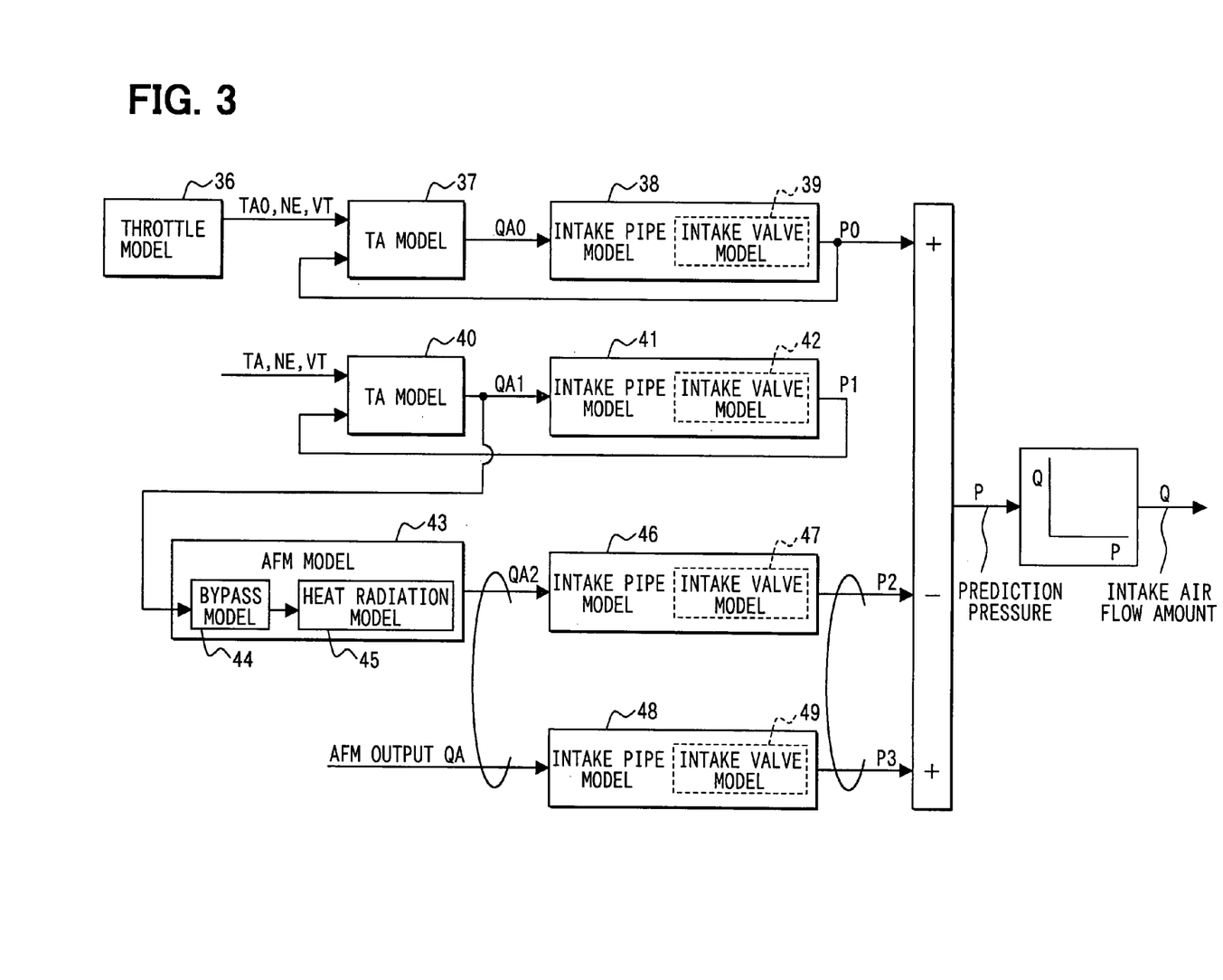
FIG. 3 is a block diagram showing an operation for calculating an amount of intake air according to the embodiment.

Next, a calculation of the intake amount of the engine 11 using the ECU 27 is described in reference with FIG. 3. An electric throttle model 36 outputs prediction throttle opening degree TA0, engine rotation speed NE, valve timing VT and the like to a TA model (throttle air model) 37. Here, the prediction throttle opening degree TA0 is throttle opening degree after elapsing a predetermined period from the present time, and is calculated in accordance with a present throttle opening degree TA and the like. An intake pipe model 38 outputs a prediction intake pipe pressure P0, which is input to the TA model 37.

The TA model 37 calculates an amount (air flow amount) QA0 of air flowing through the throttle valve 15 in accordance with the prediction throttle opening degree TA0, the engine rotation speed NE, the valve timing VT, the prediction intake pipe pressure P0, and the like. The TA model 37 transmits the air flow amount QA0 to the intake pipe model 38.

The intake pipe model 38 includes an intake valve model 39, and calculates the prediction intake pipe pressure P0, which is pressure after elapsing a predetermined period from the present time, in accordance with the air flow amount QA0. The prediction intake pipe pressure P0 is prediction intake pipe pressure when an intake valve 35 is closed.

The throttle opening degree TA, the engine rotation speed NE, the valve timing VT and the like are input to a TA model 40. Present intake pipe pressure P1, which is output from an intake pipe model 41, is also input to the TA model 40.

The TA model 40 calculates an air flow amount QA1 of air flowing through the throttle valve 15 in accordance with the throttle opening degree TA, the engine rotation speed NE, the valve timing VT, the present intake pipe pressure P1, and the like. The TA model 40 transmits the air flow amount QA1 to the intake pipe model 41. The intake pipe model 41 includes an intake valve model 42, and calculates the present intake pipe pressure P1 in accordance with the present air flow amount QA1.

The present air flow amount QA1, which is output from the TA model 40, is input to an AFM model (air flow meter model) 43. The AFM model 43 includes a bypass model 44 and a heat radiation model 45, and calculates an air flow amount QA2. The air flow amount QA2 has time delay, which is equivalent to delay in response (response delay) of the air flow meter 14, with respect to the present air flow amount QA1. The AFM model 43 outputs the air flow amount QA2 to an intake pipe model 46.

The intake pipe model 46 includes an intake valve model 47, and calculates an intake pipe pressure P2, which has time delay, in accordance with the air flow amount QA2 input from the AFM model 43.

An air flow amount QA, which is output from the air flowmeter 14, is input to an intake pipe model 48. The intake pipe model 48 includes an intake valve model 49, and calculates an intake pipe pressure P3, which has time delay, in accordance with the air flow amount QA. The intake pipe pressure P3, which is output from the intake pipe model 48, has time delay as well as the intake pipe pressure P2, which is output from the intake pipe model 46. The intake pipe pressure P3 is equivalent to the intake pipe pressure P2 in response.

The intake pipe pressure P3, which is output from the intake pipe model 48, is added to the intake pipe pressure P0, which is output from the intake pipe model 38. The intake pipe pressure P2, which is output from the intake pipe model 46, is subtracted from the value, which is calculated by adding the intake pipe pressure P3 to the intake pipe pressure P0, so that prediction pressure P is calculated. An intake air flow amount Q, when the intake valve 35 is closed, is calculated in accordance with the prediction pressure P using a data map, a formula, or the like. Thereby, the intake air flow amount Q, which is compensated for the response delay of the air flowmeter 14, is calculated. This operation serves as a response delay compensating means.

Next, the bypass model 44 and the heat radiation model 45 of the AFM model 43 is described.

In the bypass-type thermal air flow meter 14, variation in a bypass flow amount, which is an air flow amount in the bypass passage 29, delays relative to variation in a main flow amount, which is an air flow amount in the main passage 28. Accordingly, the air flowmeter 14 delays in response due to the delay in the bypass flow (bypass delay). Besides, heat, which is radiated from the hot wire 30 to intake air, delays due to the bobbin 32, around which the hot wire 30 is wound, the support 33 supporting the bobbin 32, and the like. Accordingly, the response delay arises in the air flowmeter 14 due to the delay in heat radiation (radiation delay).

Figure 12:
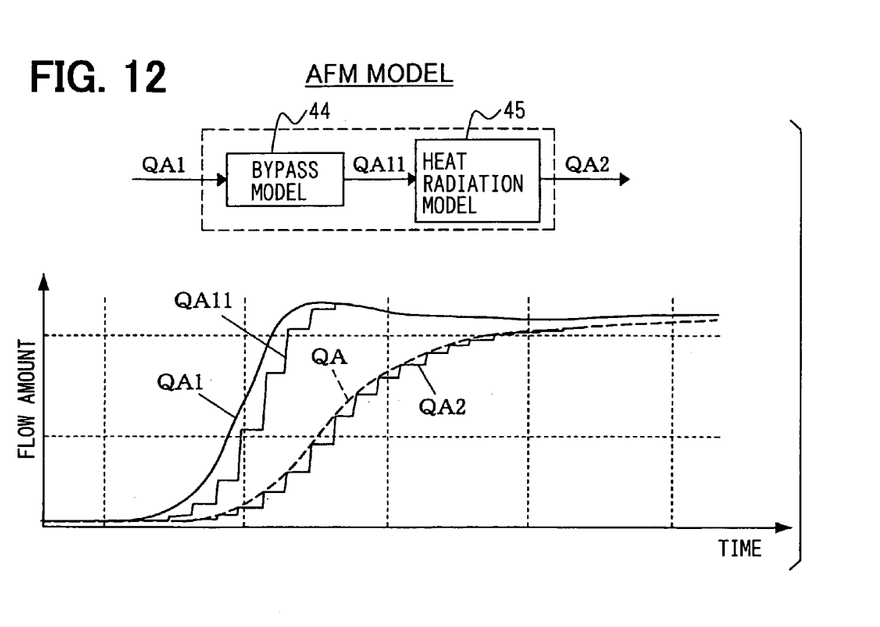
FIG. 12 is a view for explaining an AFM model according to the embodiment.

Therefore, as shown in FIG. 12, the bypass model 44 in the AFM model 43 calculates an air flow amount (bypass flow delay information) QA11 for compensating the response delay of the air flowmeter 14 due to the bypass delay, in this embodiment. The air flow amount QA11 has delay relative to the air flow amount QA1 input to the bypass model 44. The delay of the air flow amount QA11 is equivalent to the response delay of the air flowmeter 14 due to the bypass delay. This operation serves as a bypass flow delay information calculating means.

Furthermore, the heat radiation model 45 calculates an air flow amount (heat radiation delay information) QA2 for compensating the response delay of the air flowmeter 14 due to the radiation delay. The air flow amount QA2 has delay relative to the air flow amount QA11 output from the bypass model 44. The delay of the air flow amount QA2 is equivalent to the response delay of the air flowmeter 14 due to the radiation delay. This operation serves as a heat radiation delay information calculating means.

Figure 4:
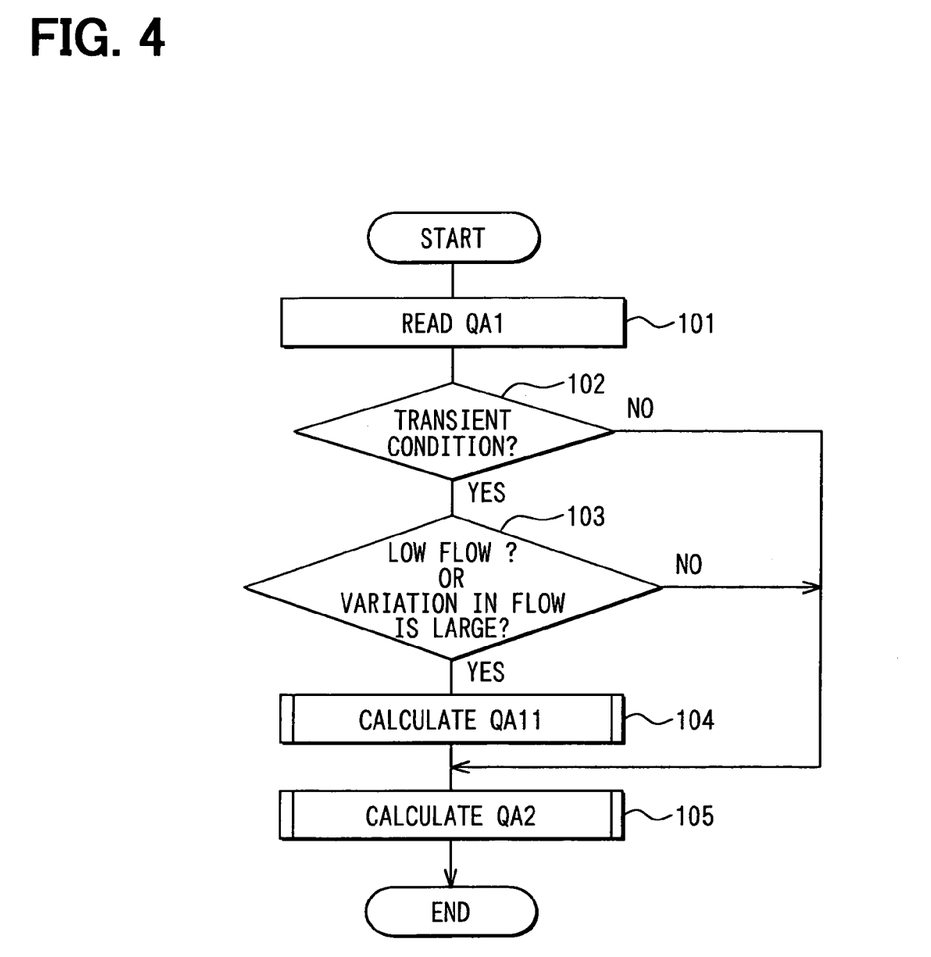
FIG. 4 is a flowchart showing a processing of a main program for calculating the amount of intake air according to the embodiment.
Figure 5:
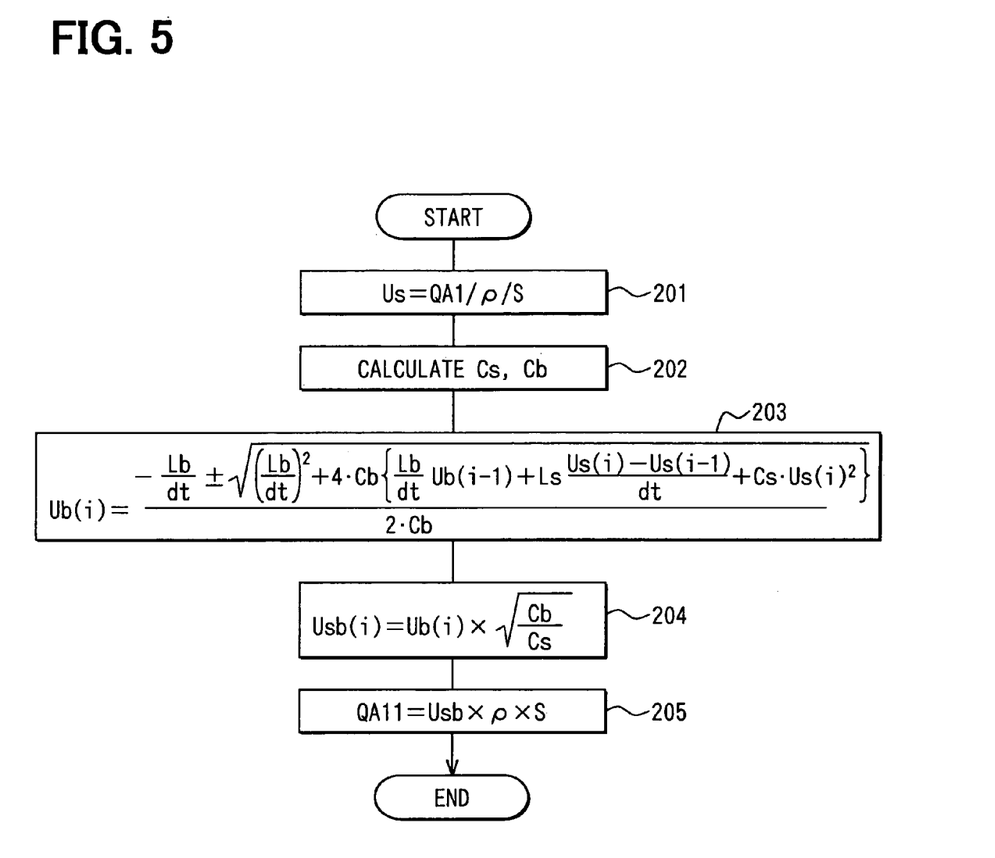
FIG. 5 is a flowchart showing a processing of a main program, which considers delay in bypass flow for calculating the amount of intake air according to the embodiment.
Figure 6:
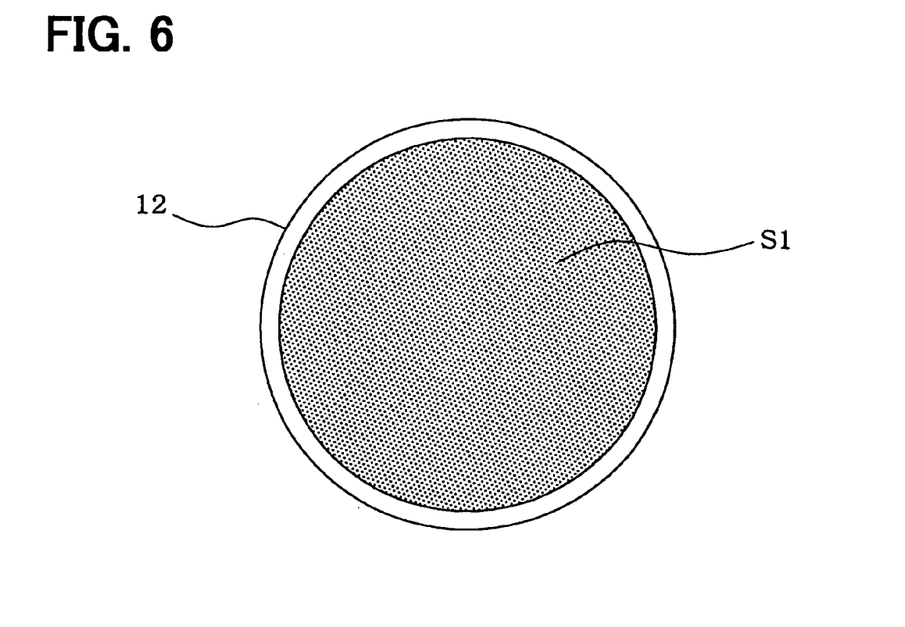
FIG. 6 is a front view showing an air intake passage of the bypass-type thermal flowmeter according to the embodiment.

Next, an operation of the bypass model 44 and the heat radiation model 45 in the AFM model 43 is described in reference to FIGS. 4, 5. Here, the air flow amount QA2 has delay equivalent to the response delay of the air flowmeter 14. The response delay of the air flowmeter 14 is caused by the bypass delay and the radiation delay.

As shown in FIG. 4, a main program for calculating the air flow amount is executed in a cycle of a predetermined period, while the engine 11 is operated. When the main program shown in FIG. 4 is started, the present air flow amount QA1, which is transmitted from the TA model 40, is read as a main air flow amount QA1, in step 101.

Subsequently, the routine proceeds to step 102, in which it is evaluated whether the main air flow amount QA1 is in a transient condition or not. When the main air flow amount QA1 is determined to be in the transient condition, the routine proceeds to step 103, in which it is evaluated whether the main air flow amount QA1 is in a low flow amount region or whether the main air flow amount QA1 is large in variation.

When the main air flow amount QA1 is determined to be in the transient condition, and is determined to be in the low flow amount region, alternatively, when the main air flow amount QA1 is determined to be in the transient condition, and is determined to be large in variation, influence of the response delay of the air flowmeter 14 due to the bypass delay is determined to be relatively large. In this case, the routine proceeds to step 104, and a program, which compensates the bypass delay, for calculating the amount of intake air shown in FIG. 5 is executed. Thereby, the air flow amount QA11, is calculated. The air flow amount QA11 has the delay, which is equivalent to the response delay of the air flowmeter 14 due to the bypass delay, with respect to the main air flow amount QA1.

In step 201, main flow velocity Us, which is velocity of air flowing through the main passage 28, is calculated in accordance with the following formula, using the main air flow amount QA1, air density ρ, and a cross sectional area (passage cross sectional area) S of the passage.

$$Us = QA1 \times 1/\rho \times 1/S$$

The passage cross sectional area S is the cross sectional area in the intake passage 12 at the location, in which the air flowmeter 14 is mounted to the intake passage 12. The passage cross sectional area S is calculated in accordance with the following formula.

$$S = S1 - S2 + S3$$

Figure 7:
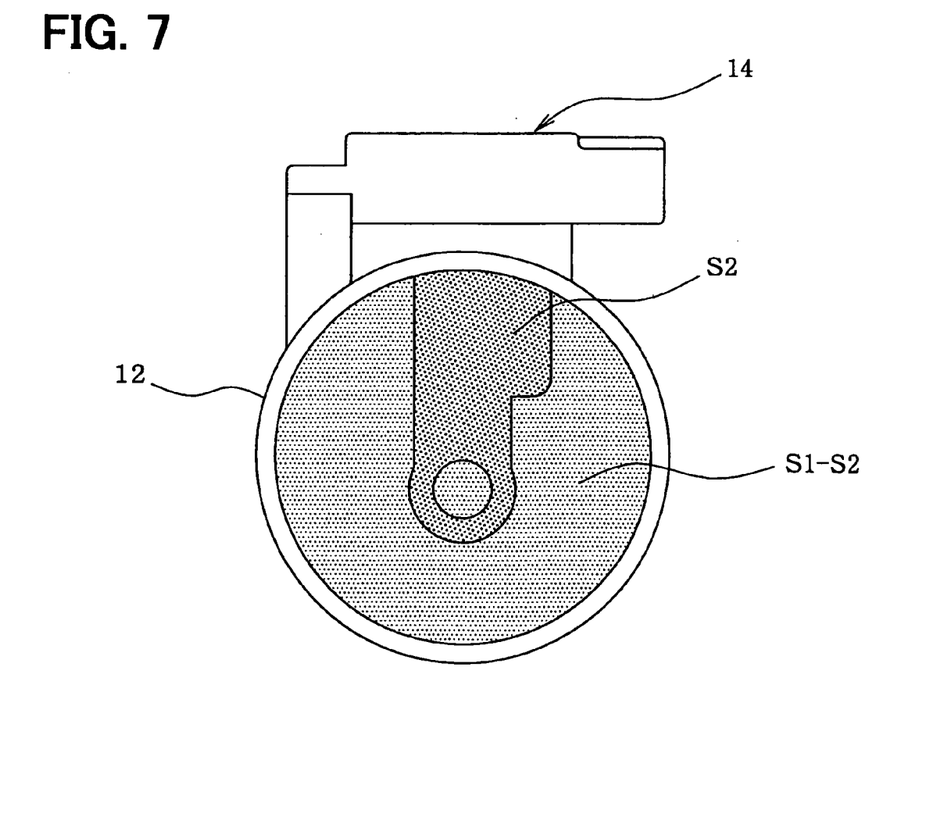
FIG. 7 is a front view showing a bypass passage arranged in the air intake passage according to the embodiment.

Here, S1 shows the cross sectional area of the intake passage 12. S2 shows a project area (FIG. 7) of a portion of the air flow meter 14, the portion of the air flow meter 14 being arranged within the intake passage 12. S3 is the cross sectional area of the bypass passage 29 (FIG. 2).

Figure 8:
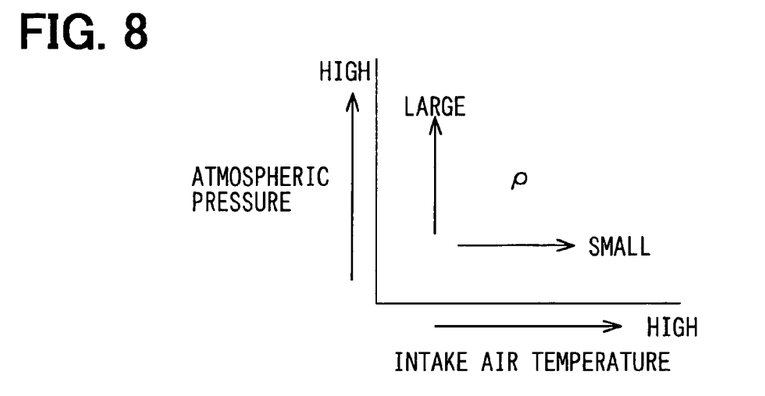
FIG. 8 is a schematic view showing a data map of air density ρ according to the embodiment.

The air density ρ, which corresponds to present temperature of intake air and corresponds to present atmospheric pressure, is calculated using the data map shown in FIG. 8, a formula, or the like. The data map of the air density ρ or the formula of the air density ρ is set such that the air density ρ decreases as intake air temperature increases, and the air density ρ increases as the atmospheric pressure increases.

The main flow velocity Us is calculated in the above manner, and subsequently, the routine proceeds to steps 202, 203, in which a bypass flow velocity Ub, i.e., flow velocity of air flowing through the bypass passage 29 is calculated.

Here, a hydrokinetic equation in the main passage 28 and a hydrokinetic equation in the bypass passage 29 are shown by the following formulas.

$$\frac{\Delta P}{\rho} = Ls \frac{dUs}{dt} + Cs \cdot Us^2 \quad (1)$$

$$\frac{\Delta P}{\rho} = Lb \frac{dUb}{dt} + Cb \cdot Ub^2 \quad (2)$$

ΔP shows pressure difference between an inlet of the main passage 28 and an outlet of the main passage 28 in formula (1), and shows pressure difference between an inlet of the bypass passage 29 and an outlet of the bypass passage 29 in formula (2). Ls shows the length of the main passage 28, and Lb shows the length of the bypass passage 29. Cs shows a loss factor of the main passage 28, and Cb shows a loss factor of the bypass passage 29.

The above formulas (1), (2) are solved with respect to the bypass flow velocity Ub, so that the following formula (3) is introduced.

$$Ub(i) = \frac{-\frac{Lb}{dt} \pm \sqrt{\left(\frac{Lb}{dt}\right)^2 + 4 \cdot Cb \left\{\frac{Lb}{dt} Ub(i-1) + Ls \frac{Us(i) - Us(i-1)}{dt} + Cs \cdot Us(i)^2 \right\}}}{2 \cdot Cb} \quad (3)$$

Us(i) is the present value of the main flow velocity, and Us(i−1) is the previous value of the main flow velocity. Ub(i) is the present value of the bypass flow velocity, and Ub(i−1) is the previous value of the bypass flow velocity.

Figure 9:
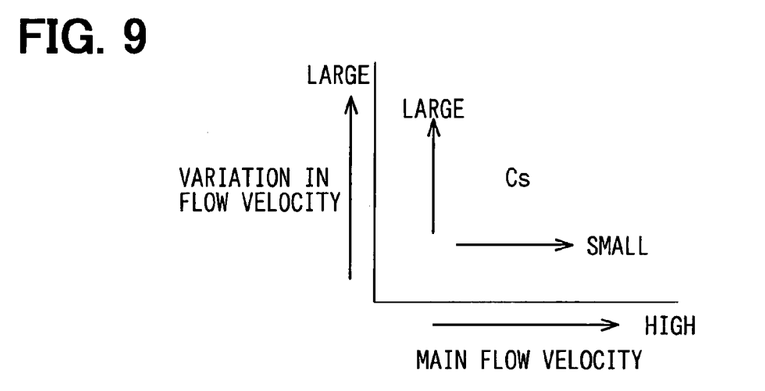
FIG. 9 is a schematic view showing a data map of loss factor Cs of a main passage according to the embodiment.
Figure 10:
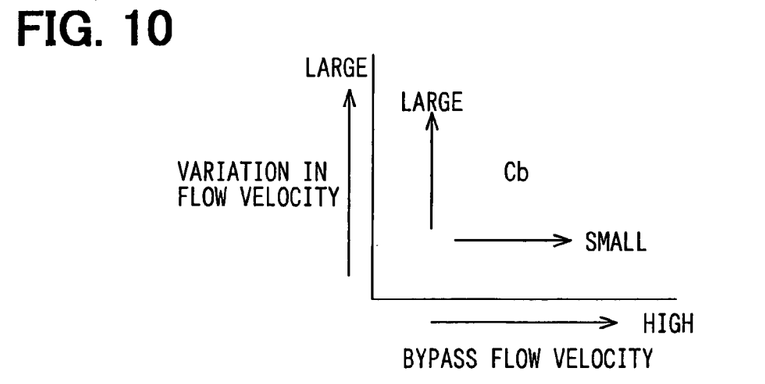
FIG. 10 is a schematic view showing a data map of loss factor Cb of the bypass passage according to the embodiment.

When the bypass flow velocity Ub is calculated, in step 202, the loss factor Cs of the main passage 28, which corresponds to the previous main flow velocity and variation in main flow velocity, is calculated using the data map of the loss factor Cs shown in FIG. 9, a formula, or the like. That is, the loss factor Cs corresponds to the previous main flow amount and variation in main flow amount. Besides, in step 202, the loss factor Cb of the bypass passage 29, which corresponds to the previous bypass flow velocity and variation in bypass flow velocity, is calculated using the data map of the loss factor Cb shown in FIG. 10, a formula, or the like. That is, the loss factor Cb corresponds to the previous bypass flow amount and variation in bypass flow amount. The data maps of the loss factors Cs, Cb are set such that the loss factors Cs, Cb decrease as the flow velocity increases, i.e., the flow amount increases, and the loss factors Cs, Cb increase as the variation in flow velocity increases, i.e., the variation in flow amount increases.

Here, a relationship between the loss factor Cs of the main passage 28 and the loss factor Cb of the bypass passage 29, when the air flow amount is in a steady condition, may be stored beforehand in a design stage. Besides, the loss factor Cs, which corresponds to the previous main flow velocity and variation in main flow velocity, is calculated using the data map or the like, while the engine 11 is operated. Subsequently, the loss factor Cb of the bypass passage 29 may be calculated in accordance with the loss factor Cs of the main passage 28 using the relationship, which is between the loss factor Cs and the loss factor Cb, stored beforehand.

After calculation of the loss factors Cs, Cb, the routine proceeds to step 203. The present value Ub(i) of the bypass flow velocity is calculated in accordance with the formula (3) using the present value Us(i) of the main flow velocity, the previous value Us(i−1) of the main flow velocity, the previous value Ub(i−1) of the bypass flow velocity, the loss factors Cs, Cb, and the like, in step 203.

The routine proceeds to step 204, in which a main flow velocity Usb(i) is calculated. The main flow velocity Usb(i) has delay, which is equivalent to delay in variation in the bypass flow amount. This delay in variation in the bypass flow amount is delay with respect to variation in the main flow amount. That is, the delay, which arises in the bypass flow with respect to the main flow, is considered in the flow velocity Usb(i). The following formula (4) is calculated in accordance with a premise, in which the formulas (1), (2) are valid in the steady condition, i.e., the terms differentiated with respect to time in the formulas (1), (2) are considered to be 0.

$$Usb = Ub \times \sqrt{\frac{Cb}{Cs}} \quad (4)$$

After calculating the flow velocity Usb(i), in which the bypass delay with respect to the main flow is considered, the routine proceeds to step 205, in which the air flow amount QA11 is calculated in accordance with the following equation using the flow velocity Usb(i), air density ρ, and the passage cross sectional area S.

$$QA11 = Usb \times \rho \times S$$

The flow velocity Usb(i), in which the bypass delay is considered, is equivalent to the main flow velocity, which delays with respect to the present main flow velocity Us. The delay of the main flow velocity with respect to the present main flow velocity Us is equivalent to delay in variation in bypass flow amount with respect to variation in main flow amount.

The flow velocity Usb is converted to the air flow amount QA11, so that the air flow amount QA11, which has delay with respect to the present main flow amount QA1, can be calculated. The delay of the air flow amount QA11 is equivalent to delay in variation in bypass flow amount with respect to variation in main flow amount. That is, the air flow amount QA11 has delay, which is equivalent to the response delay of the air flowmeter 14 due to the bypass delay, with respect to the present main flow amount QA1.

As described above, the air flow amount QA11 is calculated. Subsequently, the routine proceeds to step 105 in FIG. 4, in which the air flow amount QA2 is calculated. The air flow amount QA2 has delay, which is equivalent to the response delay of the air flowmeter 14 due to the radiation delay, with respect to the air flow amount QA11.

Figure 11:
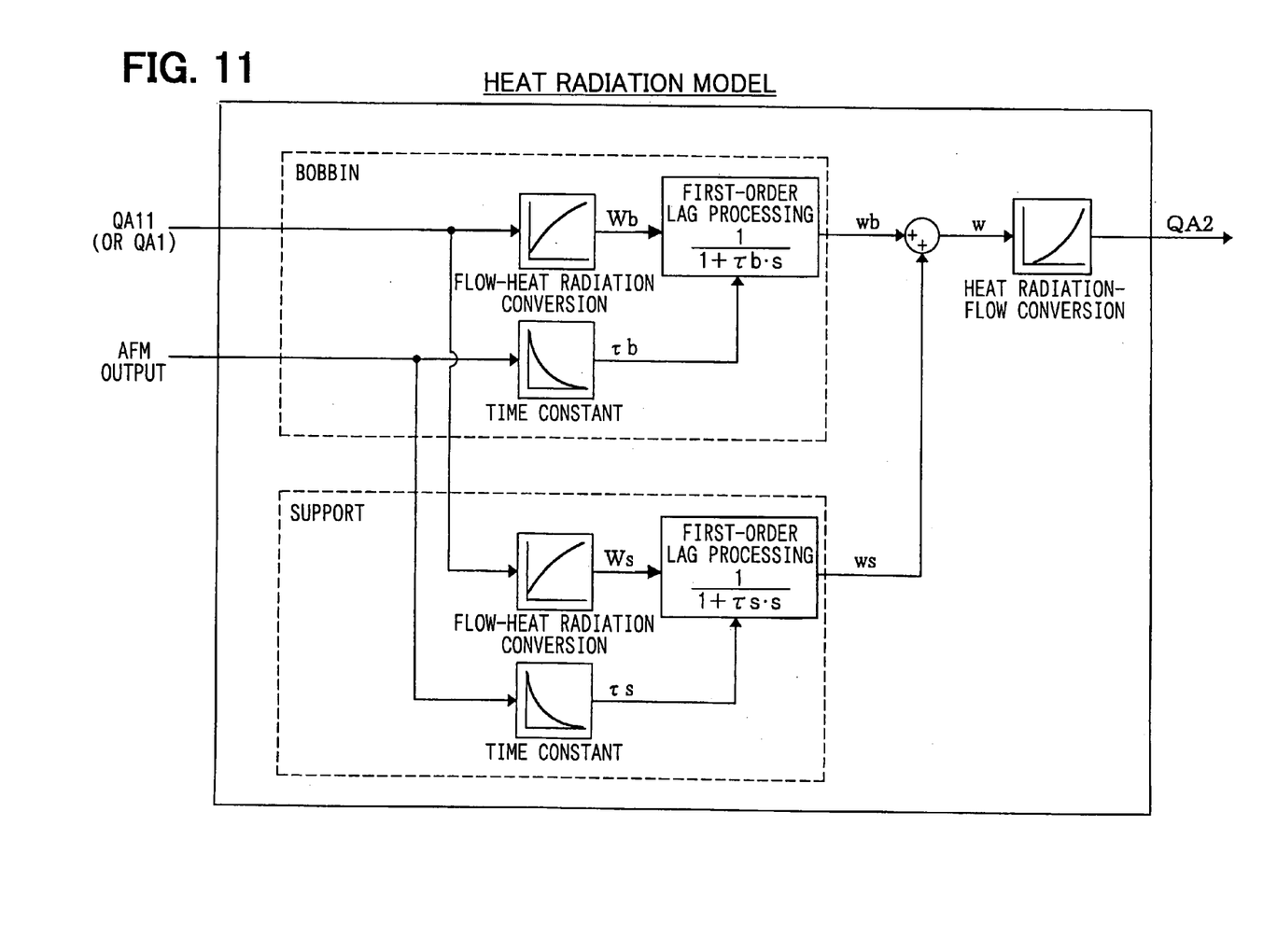
FIG. 11 is a block diagram showing an operation of a heat radiation model according to the embodiment.

As shown in FIG. 11, a bobbin perfect heat radiation amount Wb corresponding to the air flow amount QA11 is calculated using a data map or the like. The bobbin perfect heat radiation amount Wb is a heat radiation amount of the bobbin 32 excluding the response delay. A time constant τb, which corresponds to the output of the air flowmeter 14, is calculated for a first-order lag processing, using a data map or the like. The first-order lag processing is performed with respect to the bobbin perfect heat radiation amount Wb using the time constant τb, so that a bobbin response heat radiation amount wb is calculated. The bobbin response heat radiation amount wb shows a heat radiation amount of the bobbin 32 including the response delay.

Besides, a support perfect heat radiation amount Ws corresponding to the air flow amount QA11 is calculated using a data map or the like. The support perfect heat radiation amount Ws is a heat radiation amount of the support 33 excluding the response delay. A time constant τs, which corresponds to the output of the air flowmeter 14, is calculated for a first-order lag processing, using a data map or the like. The first-order lag processing is performed with respect to the support perfect heat radiation amount Ws using the time constant τs, so that a support response heat radiation amount ws is calculated. The support response heat radiation amount ws shows a heat radiation amount of the support 33 including the response delay.

Subsequently, the bobbin response heat radiation amount wb is added to the support response heat radiation amount ws, so that a whole heat radiation amount w is calculated. The air flow amount QA2, which corresponds to the whole heat radiation amount w, is calculated using a data map or the like. The air flow amount QA2 has delay, which is equivalent to the response delay of the air flowmeter 14 due to the radiation delay, with respect to the air flow amount QA1.

In step 102, when the main flow amount QA1 is determined to be in the steady condition, the response delay of the air flowmeter 14 due to the bypass delay is determined to be relatively small. Alternatively, even when the main flow amount QA1 is in the transient condition, in step 103, when the main flow amount QA1 is neither in the low flow amount region, nor large in variation, the response delay of the air flowmeter 14 due to the bypass delay is determined to be relatively small. In these situations, the routine proceeds to step 105, without executing the processing in step 104, i.e., the processing for calculating the air flow amount QA11, in which the bypass delay is considered. That is, the air flow amount QA2 having delay, which is equivalent to the response delay of the air flowmeter 14 due to the radiation delay, with respect to the main flow amount QA1 is calculated.

In the above processing, when influence of the response delay of the air flowmeter 14 due to by the bypass delay is relatively large, the air flow amount QA11, in which the bypass delay is considered, is calculated. Furthermore, the air flow amount QA2 is calculated. The air flow amount QA2 has delay, which is equivalent to the response delay of the air flowmeter 14 due to the radiation delay, with respect to the air flow amount QA11. Thereby, when influence of the response delay of the air flowmeter 14 due to the bypass delay is relatively large, both the response delay of the air flowmeter 14 due to the bypass delay and the response delay of the air flowmeter 14 due to the radiation delay are compensated.

By contrast, when influence of the response delay of the air flowmeter 14 due to the bypass delay is determined to be relatively small, the air flow amount QA2 having delay, which is equivalent to the response delay of the air flowmeter 14 due to the radiation delay, with respect to the air flow amount QA1 is calculated. Thereby, when influence of the response delay of the air flowmeter 14 due to the bypass delay is relatively small, only the response delay of the air flowmeter 14 due to the radiation delay is compensated.

Figure 13:
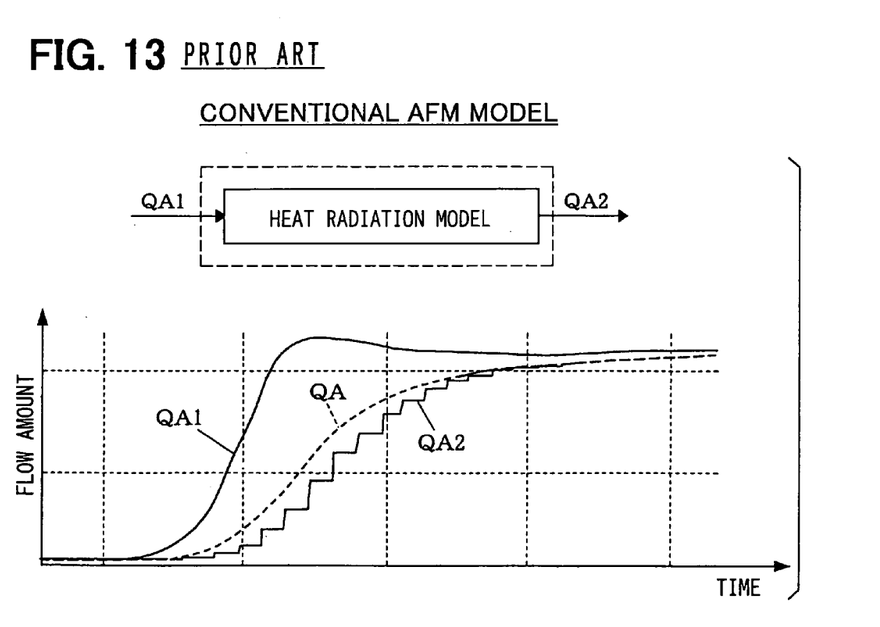
FIG. 13 is a view for explaining an AFM model according to a prior art.

As shown in FIG. 13, a conventional AFM model does not have the bypass model. Accordingly, the conventional AFM model calculates the air flow amount QA2 having delay, which is equivalent to the response delay of the air flowmeter 14 due to the radiation delay, with respect to an input air flow amount QA1, so that the conventional AFM model outputs the air flow amount QA2. That is, when influence of the response delay of the air flowmeter 14 due to the bypass delay is relatively large, the air flow amount QA2, which is output from the conventional AFM model, does not become a value, by which the air flow amount QA detected using the air flowmeter 14 is accurately simulated. Accordingly, the response delay of the air flowmeter 14 cannot be accurately compensated. As a result, accuracy in calculation of the intake air flow amount of the engine 11 decreases in the conventional AFM model.

By contrast, as show in FIG. 12, in the AFM model according to this embodiment, the main flow amount QA1 is input to the bypass model 44. Subsequently, the air flow amount QA11 having delay, which is equivalent to the response delay of the air flowmeter 14 due to the bypass delay, with respect to the main flow amount QA1 is calculated in the bypass model 44. Furthermore, the air flow amount QA2 having delay, which is equivalent to the response delay of the air flowmeter 14 due to the radiation delay, with respect to the main flow amount QA11 is calculated in the heat radiation model 45. Thereby, even when influence of the response delay of the air flowmeter 14 due to the bypass delay is relatively large, the air flow amount QA2, which is output from the AFM model in this embodiment, can become a value, by which the air flow amount QA detected using the air flowmeter 14 is accurately simulated. Therefore, the response delay of the air flowmeter 14 can be accurately compensated, so that accuracy in calculation of the intake air flow amount of the engine 11 increases in this AFM model.

Furthermore, in this embodiment, the main flow velocity Us is compensated in accordance with the present air density ρ and the passage cross sectional area S, in consideration of variation in air flow velocity due to the air density and the passage cross sectional area. Here, the passage cross sectional area S is the cross sectional area in the intake passage 12 at the location, in which the air flowmeter 14 is mounted to the intake passage 12. Thereby, the main flow velocity Us can be accurately calculated. Furthermore, accuracy in compensation of the response delay in the air flowmeter 14 can be enhanced. Here, the air density ρ may be a fixed value for simplifying an arithmetic processing.

The loss factor Cs of the main passage 28 and the loss factor Cb of the bypass passage 29 vary in accordance with the flow velocity and the variation in flow velocity. Therefore, in this embodiment, the loss factors Cs, Cb, which are used for calculation of the bypass flow velocity Ub, are changed in accordance with the flow velocity, i.e., the flow amount, and the variation in flow velocity, i.e., the variation in flow amount. Thereby, the bypass flow velocity Ub can be accurately calculated. Furthermore, accuracy in compensation of the response delay in the air flowmeter 14 can be enhanced. Here, at least one of the loss factors Cs, Cb may be changed in accordance with at least one of the flow velocity, i.e., the flow amount, and the variation in flow velocity, i.e., the variation in flow amount. The loss factors Cs, Cb may be fixed values for simplifying an arithmetic processing.

When the flow condition is in the vicinity of the steady condition, the response delay due to the bypass delay becomes small, even when the flow is in the transient condition, in which the response delay of the air flowmeter 14 has large influence. In this situation, delay in heat radiation becomes a primary factor of the response delay. Therefore, in this embodiment, the air flow amount QA2, in which both the bypass delay and the radiation delay are considered, is calculated only in the transient region, in which the main flow amount is in the low flow amount region or the variation in flow amount becomes large.

By contrast, when the flow condition is out of the above region, the air flow amount QA2, in which only the radiation delay is considered, is calculated. Thereby, accuracy in compensation of the response delay of the air flowmeter 14 can be maintained by only compensating the radiation delay in the region, in which the response delay due to the bypass delay becomes small, even when the flow is in the transient region, in which the response delay of the air flowmeter 14 has large influence. In this case, accuracy in compensation of the response delay can be maintained, while reducing a processing load of the ECU 27 by terminating the processing for calculation of the air flow amount QA11, in which the bypass delay is considered.

However, when the ECU 27 has a sufficient processing performance, the flow amount QA2, in which both the bypass delay and the radiation delay are considered, can be regularly calculated.

The methods for calculating all the air flow amount, in which the bypass delay is considered, the air flow amount, in which the radiation delay is considered, the intake flow amount, and the like in the above embodiment of the present invention may be modified as appropriate.

Various modifications and alternations may be diversely made to the above embodiments without departing from the spirit of the present invention.

What is claimed is:

1. An intake air flow detecting device for an internal combustion engine, the detecting device being provided to an intake air passage, through which intake air flows into the internal combustion engine, intake air, which flows through the intake air passage, being divided into intake air flowing through a main passage and intake air flowing through a bypass passage, the detecting device comprising:

a thermal type air flowmeter that includes a detector arranged in the bypass passage, the detector detecting an air flow amount in the intake air passage;

a bypass flow delay information calculating means that calculates a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;

a response delay compensating means that compensates delay in response of the air flowmeter in accordance with the bypass flow delay information;

a first means that calculates air flow velocity in the main passage in accordance with the main flow amount, the air flow velocity calculated using the first means being a main flow velocity; and a second means that calculates air flow velocity in the bypass passage in accordance with the main flow velocity, a loss factor of the main passage, and a loss factor of the bypass passage, the air flow velocity calculated using the second means being a bypass flow velocity, wherein the bypass flow delay information calculating means that calculates the bypass flow delay information in accordance with the bypass flow velocity.

2. The detecting device according to claim 1, wherein the bypass flow delay information calculating means compensates the main flow velocity in accordance with at least one of a cross sectional area of the main passage and air density.

3. The detecting device according to claim 1, wherein the bypass flow delay information calculating means changes at least one of the loss factor of the main passage and the loss factor of the bypass passage, wherein the loss factor of the main passage is changed in accordance with at least one of the main flow velocity and variation in the main flow velocity, and the loss factor of the bypass passage is changed in accordance with at least one of the bypass flow velocity and variation in the bypass flow velocity.

4. The detecting device according to claim 1, wherein the bypass flow delay information calculating means calculates the air flow amount in the bypass passage, which has delay in the variation in the bypass flow amount with respect to the variation in the main flow amount, and the air flow amount calculated using the bypass flow delay information calculating means is included in the bypass flow delay information.

5. An intake air flow detecting device for an internal combustion engine, the detecting device being provided to an intake air passage, through which intake air flows into the internal combustion engine, intake air, which flows through the intake air passage, being divided into intake air flowing through a main passage and intake air flowing through a bypass passage, the detecting device comprising:

a thermal type air flowmeter that includes a detector arranged in the bypass passage, the detector detecting an air flow amount in the intake air passage;

a bypass flow delay information calculating means that calculates a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;

a response delay compensating means that compensates delay in response to the air flowmeter in accordance with the bypass flow delay information; and a heat radiation delay information calculating means that calculates a heat radiation delay information, the heat radiation delay information being an information of delay in heat radiation of the detector of the air flowmeter, wherein the response delay compensating means compensates delay in response of the air flowmeter in accordance with at least one of the bypass flow delay information and the heat radiation delay information.

6. The detecting device according to claim 5, wherein the response delay compensating means compensates delay in response of the air flowmeter in accordance with both the bypass flow delay information and the heat radiation delay information only when both following two conditions are satisfied:

the main flow amount is in a transient region; and the main flow amount is in at least one of the following two conditions, in which the main flow amount is in a low flow amount region and the main flow amount is large in variation, and the response delay compensating means compensates delay in response of the air flowmeter in accordance with the heat radiation delay information when at least one of following two conditions is satisfied:

the main flow amount is out of the transient region; and the main flow amount is out of both the following two conditions, in which the main flow amount is in the low flow amount region and the main flow amount is large in variation.

7. The detecting device according to claim 5, wherein the bypass flow delay information calculating means calculates the air flow amount in the bypass passage, which has delay in the variation in the bypass flow amount with respect to the variation in the main flow amount, and the air flow amount calculated using the bypass flow delay information calculating means is included in the bypass flow delay information.

8. A method of detecting intake air flow for an internal combustion engine using a detecting device provided to an intake air passage, through which intake air flows into the internal combustion engine, intake air, which flows through the intake air passage, being divided into intake air flowing through a main passage and intake air flowing through a bypass passage, the method comprising:

arranging a thermal type air flowmeter that includes a detector in the bypass passage, the detector detecting an air flow amount in the intake air passage;

calculating a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;

compensating a delay in response of the air flowmeter in accordance with the bypass flow delay information;

calculating an air flow velocity in the main passage in accordance with the main flow amount, the calculated air flow velocity in the main passage being a main flow velocity; and calculating an air flow velocity in the bypass passage in accordance with the main flow velocity, a loss factor of the main passage, and a loss factor of the bypass passage, the calculated air flow velocity in the bypass passage being a bypass flow velocity, wherein the bypass flow delay information is calculated in accordance with the bypass flow velocity.

9. The method according to claim 8, wherein the main flow velocity is compensated in accordance with a cross sectional area of the main passage and/or air density.

10. The method according to claim 8, the loss factor of the main passage and/or the loss factor of the bypass passage is changed, wherein the loss factor of the main passage is changed in accordance with the main flow velocity and/or variation in the main flow velocity, and the loss factor of the bypass passage is changed in accordance with the bypass flow velocity and/or variation in the bypass flow velocity.

11. The method according to claim 8, wherein the air flow amount in the bypass passage is calculated which has delay in the variation in the bypass flow amount with respect to the variation in the main flow amount, and the calculated air flow amount in the bypass passage is included in the bypass flow delay information.

12. A method of detecting intake air flow for an internal combustion engine using a detecting device provided to an intake air passage, through which intake air flows into the internal combustion engine, intake air, which flows through the intake air passage, being divided into intake air flowing through a main passage and intake air flowing through a bypass passage, the method comprising:

arranging a thermal type air flowmeter that includes a detector in the bypass passage, the detector detecting an air flow amount in the intake air passage;

calculating a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;

compensating a delay in response of the air flowmeter in accordance with the bypass flow delay information;

calculating a heat radiation delay information, the heat radiation delay information being an information of delay in heat radiation of the detector of the air flowmeter, wherein delay in response of the air flowmeter is compensated in accordance with the bypass flow delay information and/or the heat radiation delay information.

13. The method according to claim 12, wherein the delay in response of the air flowmeter is compensated in accordance with both the bypass flow delay information and the heat radiation delay information only when both following two conditions are satisfied:

the main flow amount is in a transient region; and the main flow amount is in at least one of the following two conditions, in which the main flow amount is in a low flow amount region and the main flow amount is large in variation, and the delay in response of the air flowmeter is compensated in accordance with the heat radiation delay information when at least one of following two conditions is satisfied:

the main flow amount is out of the transient region; and the main flow amount is out of both the following two conditions, in which the main flow amount is in the low flow amount region and the main flow amount is large in variation.

14. The method according to claim 12,
wherein the air flow amount in the bypass passage is calculated which has delay in the variation in the bypass flow amount with respect to the variation in the main flow amount, and
the air flow amount in the bypass passage is included in the bypass flow delay information.

15. An intake air flow detecting device for an internal combustion engine, the detecting device being provided to an intake air passage, through which intake air flows into the internal combustion engine, intake air, which flows through the intake air passage, being divided into intake air flowing through a main passage and intake air flowing through a bypass passage, the detecting device comprising:
a thermal type air flowmeter that includes a detector arranged in the bypass passage, the detector detecting an air flow amount in the intake air passage;
bypass flow delay information calculator circuitry that calculates a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;
response delay compensating circuitry that compensates delay in response of the air flowmeter in accordance with the bypass flow delay information;
first air flow velocity calculator circuitry that calculates air flow velocity in the main passage in accordance with the main flow amount, the air flow velocity calculated using the first circuitry being a main flow velocity; and
second air flow velocity calculator circuitry that calculates air flow velocity in the bypass passage in accordance with the main flow velocity, a loss factor of the main passage, and a loss factor of the bypass passage, the air flow velocity calculated using the second circuitry being a bypass flow velocity,
wherein the bypass flow delay information calculator circuitry calculates the bypass flow delay information in accordance with the bypass flow velocity.

16. The detecting device according to claim 15, wherein the bypass flow delay information calculator circuitry compensates the main flow velocity in accordance with at least one of a cross sectional area of the main passage and air density.

17. The detecting device according to claim 15,
wherein the bypass flow delay information calculator circuitry changes at least one of the loss factor of the main passage and the loss factor of the bypass passage,
wherein the loss factor of the main passage is changed in accordance with at least one of the main flow velocity and variation in the main flow velocity, and
the loss factor of the bypass passage is changed in accordance with at least one of the bypass flow velocity and variation in the bypass flow velocity.

18. The detecting device according to claim 15,
wherein the bypass flow delay information calculator circuitry calculates an air flow amount, which has delay in the variation in the bypass flow amount with respect to the variation in the main flow amount, and
the air flow amount calculated using the bypass flow delay information calculator circuitry is included in the bypass flow delay information.

19. An intake air flow detecting device for an internal combustion engine, the detecting device being provided to an intake air passage, through which intake air flows into the internal combustion engine, intake air, which flows through the intake air passage, being divided into intake air flowing through a main passage and intake air flowing through a bypass passage, the detecting device comprising:
a thermal type air flowmeter that includes a detector arranged in the bypass passage, the detector detecting an air flow amount in the intake air passage;
bypass flow delay information calculator circuitry that calculates a bypass flow delay information, the bypass flow delay information being an information of delay in variation in a bypass flow amount with respect to variation in a main flow amount, the bypass flow amount being an air flow amount in the bypass passage, the main flow amount being an air flow amount in the main passage;
response delay compensating circuitry that compensates delay in response of the air flowmeter in accordance with the bypass flow delay information; and
a heat radiation delay information calculator circuitry that calculates a heat radiation delay information, the heat radiation delay information being an information of delay in heat radiation of the detector of the air flowmeter,
wherein the response delay compensating circuitry compensates delay in response of the air flowmeter in accordance with at least one of the bypass flow delay information and the heat radiation delay information.

20. The detecting device according to claim 19,
wherein the response delay compensating circuitry compensates delay in response of the air flowmeter in accordance with both the bypass flow delay information and the heat radiation delay information only when both following two conditions are satisfied:
the main flow amount is in a transient region; and
the main flow amount is in at least one of the following two conditions, in which the main flow amount is in a low flow amount region and the main flow amount is large in variation, and
the response delay compensating circuitry compensates delay in response of the air flowmeter in accordance with the heat radiation delay information when at least one of following two conditions is satisfied:
the main flow amount is out of the transient region; and
the main flow amount is out of both the following two conditions, in which the main flow amount is in the low flow amount region and the main flow amount is large in variation.

21. The detecting device according to claim 19,
wherein the bypass flow delay information calculator circuitry calculates an air flow amount, which has delay in the variation in the bypass flow amount with respect to the variation in the main flow amount, and
the air flow amount calculated using the bypass flow delay information calculator circuitry is included in the bypass flow delay information.

* * * * *